US012166906B2

(12) United States Patent
Fries et al.

(10) Patent No.: US 12,166,906 B2
(45) Date of Patent: Dec. 10, 2024

(54) METHOD FOR VALIDATING A DIGITAL CERTIFICATE

(71) Applicant: Siemens Aktiengesellschaft, Munich (DE)

(72) Inventors: Steffen Fries, Baldham (DE); Andreas Güttinger, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 182 days.

(21) Appl. No.: 17/176,622

(22) Filed: Feb. 16, 2021

(65) Prior Publication Data
US 2021/0266186 A1 Aug. 26, 2021

(30) Foreign Application Priority Data
Feb. 26, 2020 (EP) .................................... 20159467

(51) Int. Cl.
*H04L 9/32* (2006.01)
*H04L 9/08* (2006.01)
*H04L 9/00* (2022.01)

(52) U.S. Cl.
CPC .......... *H04L 9/3268* (2013.01); *H04L 9/0894* (2013.01); *H04L 9/3247* (2013.01); *H04L 9/50* (2022.05)

(58) Field of Classification Search
None
See application file for complete search history.

(56) References Cited

U.S. PATENT DOCUMENTS 10,547,457 B1 * 1/2020 Duccini .................... H04L 9/50
2005/0273610 A1 12/2005 Kaneda
(Continued)

FOREIGN PATENT DOCUMENTS

CH        713421 A2     8/2018
KR     2018089668 A     8/2018

OTHER PUBLICATIONS

Garba, A., et al., 2021. LightLedger: a novel blockchain-based domain certificate authentication and validation scheme. IEEE Transactions on Network Science and Engineering, 8(2), pp. 1698-1710. (Year: 2021).*
(Continued)

*Primary Examiner* — Luu T Pham
*Assistant Examiner* — Edward X Long
(74) *Attorney, Agent, or Firm* — Schmeiser, Olsen & Watts LLP

(57) ABSTRACT

Provided is a method for the validation of a digital certificate by a validation apparatus that checks the certificate of a communication partner on behalf of a first device, including the method steps of: the first device (requesting validation of the certificate of the communication partner at a first validation apparatus, the first validation apparatus querying validation information at a status collection apparatus, checking, in the first validation apparatus, whether validation information has been received from the status collection apparatus, and transmitting the validation information from the first validation apparatus to the first device, wherein, only in the event of a negative inspection result, the validation information of the certificate is determined in the first validation apparatus.

12 Claims, 4 Drawing Sheets

(56) References Cited

U.S. PATENT DOCUMENTS

| | | | |
|---|---|---|---|
| 2016/0337863 A1* | 11/2016 | Robinson | H04W 4/021 |
| 2018/0248705 A1* | 8/2018 | Schexnaydre | H04L 63/0823 |
| 2019/0260596 A1* | 8/2019 | Pala | H04L 9/3268 |
| 2020/0067706 A1* | 2/2020 | Pala | H04L 9/0891 |
| 2020/0106624 A1* | 4/2020 | Russell | H04L 9/3268 |

OTHER PUBLICATIONS

Zhang, Y., et al., 2019. Blockchain-based public integrity verification for cloud storage against procrastinating auditors. IEEE Transactions on Cloud Computing, 9(3), pp. 923-937. (Year: 2019).*
European Extended Search Report issued Sep. 10, 2020 for Application No. 20159467.8.

* cited by examiner

METHOD FOR VALIDATING A DIGITAL CERTIFICATE

CROSS-REFERENCE TO RELATED APPLICATIONS

This application claims priority to European Application No. 20159467.8, having a filing date of Feb. 26, 2020, the entire contents of which are hereby incorporated by reference.

FIELD OF TECHNOLOGY

The following relates to a method for the validation of a digital certificate by a validation apparatus that checks the certificate of a communication partner on behalf of a first device, and to a validation apparatus and to a status collection apparatus for performing the method.

BACKGROUND

Devices, for example in an automation installation, communicate with other devices or control platforms via a data network. Such devices communicating with one another are often referred to as Internet of Things devices, or IoT devices for short. IoT devices are increasingly using digital certificates in order to authenticate themselves to other communication partners or else to services that are provided for example on application servers. Digital certificates, for example in accordance with the ITU-T X.509 standard, are issued by an issuing authority of a key infrastructure and confirmed as valid through a signature with a private key of the issuing authority.

In order to validate such a certificate, that is to say to inspect its validity, multiple steps need to be performed. For instance, it is necessary to check the digital signature of the certificate, the validity period of the certificate, the purpose of use and a match with the identity of the owner of the certificate. It is also necessary to check the certificate against a revocation list. It is likewise necessary to check the certificate path, that is to say to check the certificates along a certificate chain as far as a root certificate. In the validation process, the signatures of all of the certificates in the certificate chain as well as certain parameters in the certificate are inspected.

These various steps consume a great deal of memory and computing power and in particular load IoT devices, which often have a simple structure and only a low computing and memory capacity. The execution of other processes in the device is thereby delayed. Furthermore, different IoT devices are checked in the same way, such that the result may also be made available to others, in order to carry out the check itself only on one component.

It is known to delegate the inspection of a single one or else multiple certificates to a validation service on a server that is remote from the device and that provides the complete certificate validation to the device in a single response message. For this purpose, use is made of standardized methods and in particular signaling protocols, such as for example the Online Certificate Status Protocol OCSP or else the Server-based Certificate Validation Protocol SCVP that make it possible to query a status of a digital certificate at the validation service or to perform the certificate path construction including the validation. In larger installation networks divided into multiple subnetworks, such a server is often in each case responsible for the devices in a subnetwork.

In this case, it is also possible to store a result of the certificate validation for a particular period on such a server. If a device requests validation of a certificate for which a validation result is already present on the server and if the device allows the use of a stored validation result, then the server no longer explicitly checks the certificate or the certificate path, but rather delivers the stored certificate result back to the requesting device.

Such buffer-stored results of certificate validations are however stored only for a limited period and only on the requested server. Although using such a server for certificate validation purposes reduces the computing capacity and memory capacity of the individual IoT device, this results in a significant response time until the validation result is present in the device, and also computational expenditure on the server. If a very large number of IoT devices are connected to one another or else to a service or application server in an installation, the same certificates are often validated by different servers.

SUMMARY

An aspect relates to a validation of certificates or certificate chains in a time-optimum manner and with as little computational expenditure as possible for the entire installation network.

According to a first aspect, embodiments of the invention relate to a method for the validation of a digital certificate by a validation apparatus that checks the certificate of a communication partner on behalf of a first device, comprising the method steps of:
   the first device requesting validation of the certificate of the communication partner at a first validation apparatus,
   the first validation apparatus querying validation information at a status collection apparatus,
   checking, in the first validation apparatus, whether validation information has been received from the collection apparatus, and
   transmitting the validation information from the first validation apparatus to the first device, wherein,
only in the event of a negative inspection result, the validation information of the certificate is determined in the first inspection apparatus.

Communication partners of the device are for example other devices that are arranged in an identical or different subnetwork region of an installation network. However, communication partners of the device are also devices, servers or other apparatuses that are arranged outside the installation network and are connected to the device via a communication network, for example the Internet. Validation in this case denotes checking the validity, and validation information denotes a result of the validation of a certificate. The requested validation of the certificate may comprise multiple inspection aspects, such as for example checking the integrity of the certificate, forming the certificate chain and validating the certificate chain and/or inspecting various certificate parameters. The validation information may thus accordingly contain multiple inspection results.

By virtue of querying the validation information at the status collection apparatus, validation information stored there is able to be determined without validation in the validation apparatus, and therefore promptly, and transmitted to the first device and thus provided thereto. The first device is also barely loaded by the delegated checking of the certificate. The method is thus particularly suitable for IoT devices. Only in the event of a negative inspection result, that is to say when the status collection apparatus does not provide any validation information, the validation information is determined in the first validation apparatus and it is thereby ensured that validation information is provided to the first device.

In one advantageous embodiment, in the event of a negative inspection result, the validation information determined in the first validation apparatus is additionally forwarded to the status collection apparatus.

Automatic initial population or updating of the status collection apparatus with validation information is thereby ensured. There is no need for any additional procedure for providing validation information to the status collection apparatus. This is prompted and performed automatically by the first inspection apparatus after any query of validation information with a negative result, that is to say without the return of the validation information by the status collection apparatus.

In one advantageous embodiment, the validation information is in the form of a block of a blockchain in a blockchain storage apparatus.

Storing the validation information in the form of a block of a blockchain makes it more difficult to change or manipulate the validation information, and integrity of the guaranteed. The blockchain storage apparatus may in this case be constructed from a distributed storage apparatus that in each case contains an instance of the blockchain. The validation information is thus able to be distributed to multiple storage apparatuses without further precautions and thus provided easily to a first validation apparatus.

In one advantageous embodiment, the validation information is stored in the status collection apparatus as an element of a database.

Storing the validation information as an element of a database constitutes a simple and rapid provision option.

In one advantageous embodiment, the validation information is transmitted from the first validation unit to the first device without cryptographic protection.

This allows a particularly fast response time between the first validation apparatus and the first device. In many cases, the first validation apparatus and the first device are arranged in a protected region, meaning that the transmission link is difficult to access and is thus difficult to manipulate, meaning that manipulation is unlikely even without cryptographic protection.

In one advantageous embodiment, the validation information is cryptographically protected, in particular digitally signed, by the first validation apparatus, forwarded to the status collection apparatus and stored.

This reduces manipulation of the validation information during transport to the status collection apparatus.

In one advantageous embodiment, the validation information is cryptographically protected, in particular digitally signed, by the first validation apparatus, forwarded to the status collection apparatus and stored there.

Cryptographic protection of the validation information sent from the first validation apparatus to the status collection apparatus significantly reduces the risk of manipulation. The validation information is preferably signed with the private key of the first validation apparatus. The validation information is thus also stored in the status collection apparatus in a cryptographically protected manner. The integrity of the validation information stored in the status collection apparatus is thus able to be checked, and manipulation of the validation information in the status collection apparatus is thereby made more difficult.

In one advantageous embodiment, the validation information cryptographically protected by the first checking unit is transmitted from the status collection apparatus to a second validation apparatus in response to a request and transmitted to the second device only after a successful check of the cryptographic protection in the second validation apparatus.

This has the advantage that the transmission of the validation information from the status collection apparatus to the second validation apparatus is also able to be read and manipulated by an unauthorized third party only with great difficulty. On the other hand, only a trust relationship, or the respective public key of the first validation apparatuses contained in an automation network, need to be known in each second validation apparatus.

A device or a validation apparatus is referred to as first device or a first validation apparatus when the requested validation information is determined in the validation apparatus itself, and is not provided by the status collection apparatus. A device or a validation apparatus is referred to as second device or second validation apparatus when the requested validation information is not provided to the validation apparatus by the status collection apparatus. Any validation apparatus or any device may thus be a first and second validation apparatus or a first and second device.

In one advantageous embodiment, the second validation apparatus transmits the validation information to the second device without cryptographic protection.

The second validation apparatus transmits validation information to the second device for example without a digital signature. This has the advantage that the validation information is forwarded without a delay that would be caused by verifying the validation information in the second validation apparatus, and the response time for responding to the request for the validation information is thus shortened and thus optimized. This is advantageous in particular when the second validation apparatus and the second device are arranged in a restricted-access or not publicly accessible environment.

In one advantageous embodiment, the second validation apparatus transmits the validation information to the second device with cryptographic protection.

This has the advantage that this last transmission section between the second validation apparatus and the second device are also transmitted from manipulation and reading.

The validation information may in this case have either the cryptographic protection of the first validation apparatus, that is to say, after the check for example of the digital signature of the first apparatus using the validation information, this signature is forwarded again with the validation information to the second device. The second device in this case has to have a trust relationship with each first validation apparatus, that is to say for example know the public key of each of these first validation apparatuses. It is however not necessary to calculate a new signature, meaning that the processing time is thereby shortened and the overall response time to the request is shortened. The validation information may however also be cryptographically protected by the second validation apparatus. In this case, a digital signature is formed with the private key of the second validation apparatus, for example using the positively checked validation information, and transmitted to the second device. In this case, the second device only has to have a trust relationship with the second validation apparatus, for example know the public key only of the second validation apparatus.

In one advantageous embodiment, the validation information cryptographically cryptographically protected by way of the first checking unit is checked in the status collection apparatus and, in the event of a positive inspection result, the cryptographic protection by way of the first checking unit is replaced with cryptographic protection by way of the status collection apparatus and stored in the status collection apparatus.

This has the advantage that the second validation apparatus or else the second device only has to have a trust relationship with the status collection apparatus. This means that the second validation apparatus and the second device only have to know for example the public key of the status collection apparatus. It is thus also easy to update this one key, with comparatively little transmission and administrative effort.

In one advantageous embodiment, the validation information is transmitted from the status collection apparatus to the validation apparatus only when the validation information is stored in the status collection apparatus for less than a predefined period.

The predefined period may for example be transmitted from the first validation apparatus to the status collection apparatus with the validation information, and for example the period until the earliest next update to a certificate revocation list or correspond to the period. The predefined period may however also be present in a manner fixedly predefined in the status collection apparatus or be calculated by the status collection apparatus from the time of arrival of the validation information at the status collection apparatus. This ensures that the validation information represents the valid status at the time of retrieval.

In one advantageous embodiment, the method steps are carried out by way of protocol messages in accordance with a standardized certificate validation protocol, in particular a Server-based Certificate Validation Protocol, SCVP for short.

In particular standardized certificate validation protocols that are present may thus be used as a basis for the described method. There are only a few additions, for example an added query message that a first validation apparatus, which is designed as an SCVP server, transmits to the status collection apparatus. Identifiers that are present in the certificate validation protocol, for example a flag that allows the use of stored validation information, may be reused for the described method. The effort in terms of implementing the method thus remains manageable.

A second aspect of embodiments of the invention relate to a validation apparatus for validating a digital certificate, which validation apparatus checks the certificate of a communication partner on behalf of at least one first device, comprising at least one processor that is designed to receive a request to validate the certificate of the communication partner from the first device, to query validation information at a status collection apparatus, to check whether validation information has been received from the status collection apparatus and to transmit the validation information to the first device, and, only in the event of a negative inspection result, to determine the validation information of the certificate itself and to forward the determined validation information to the status collection apparatus.

The validation apparatus may thus query validation information stored beforehand in the status collection apparatus, and thus generates a low processor load for determining the validation information. If no validation information is determined by the status collection apparatus in response to the request, then the validation information itself is generated only in these cases and the validation information is forwarded to the status collection apparatus in addition to transmitting the validation information to the first device. A validation apparatus designed in this way not only has a shorter response time, but rather also automatically populates and updates the status collection apparatus.

A third aspect of embodiments of the invention relate to a status collection apparatus comprising at least one processor that is designed to receive a query for validation information by the first validation apparatus, to transmit the validation information to the first validation apparatus and/or to receive the validation information from the first validation apparatus and to store it.

Such a status collection apparatus holds validation information for a large number of devices that is transmitted to a first or else second device upon request. Such a central status collection apparatus is able to be protected and updated more easily than a distributed system.

A fourth aspect of embodiments of the invention relate to a computer program product (non-transitory computer readable storage medium having instructions, which when executed by a processor, perform actions) comprising a non-volatile computer-readable medium that is able to be loaded directly into a memory of a digital computer, comprising program code parts that are suitable for performing the steps of the method according to one of the described method steps.

Unless stated otherwise in the following description, the terms "request", "require", "check", "transmit", and the like preferably relate to operations and/or processes and/or processing steps that change and/or generate data and/or convert data into other data, wherein the data may be represented or be present in particular in the form of physical variables, for example in the form of electrical signals. The expression "device" or "computer" should in particular be interpreted as broadly as possible in order in particular to cover all electronic devices having data processing properties. Devices may in this case in particular be devices in an automation installation able to process data in a computer-aided manner, processors and other electronic data-processing devices.

A processor in connection with embodiments of the invention may be understood to mean for example a main processor, a microprocessor or a microcontroller, for example an application-specific integrated circuit or a digital signal processor, possibly in combination with a storage unit for storing program commands, etc. A processor may also comprise multiple individual processors of a very wide variety of designs. A respective "unit" may be implemented in the form of hardware and/or also in the form of software. In the case of an implementation in the form of hardware, the respective unit may be designed as an apparatus or as part of an apparatus, for example as a computer or as a microprocessor or as a control computer. In the case of an implementation in the form of software, the respective unit may be designed as a computer program product, as a function, as a routine, as part of a program code or as an executable object.

A computer program product, such as for example a computer program means, may be provided or delivered for example as a storage medium, such as for example a memory card, USB stick, CD-ROM, DVD or else in the form of a file downloadable from a server in a network.

BRIEF DESCRIPTION

Some of the embodiments will be described in detail, with references to the following Figures, wherein like designations denote like members, wherein.

DETAILED DESCRIPTION

Figure 1:
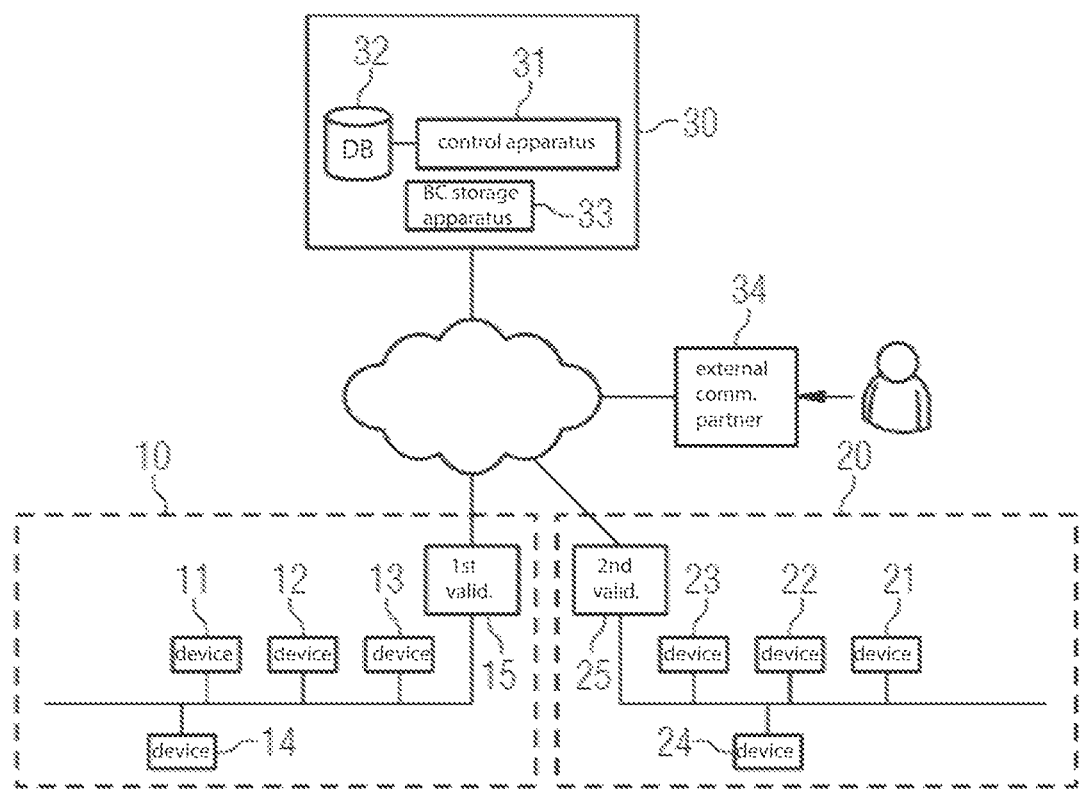
FIG. 1 shows a block diagram of an application scenario with exemplary embodiments of the first and second validation apparatus and also of the status collection apparatus in which the method is implemented.

FIG. 1 shows a communication network, for example an automation installation, with two network zones 10, 20, for example two different manufacturing regions, with devices 11, 12, 13, 14 in the first network zone and devices 21, 22, 23, 24 in the second network zone 20. The devices may for example be field devices or control units. The first and the second network zone contain a respective validation apparatus 15, 25 that performs a certificate validation locally in the respective network zone on behalf of a device 11, . . . , 14, or the second validation apparatus 25 does this on behalf of the devices 21, . . . , 24. Communication partners whose certificate is requested for validation may, in addition to the devices 11, . . . , 14, 21, . . . , 24, also be an external communication partner 34, for example an administration terminal or an application server that is connected to the first and second network zone via a public network.

When using a known certificate validation protocol, such as for example the SCVP protocol, a device, here for example the first device 11, requests validation of one or more certificates at the first validation apparatus 15. The first device 11 may additionally specify multiple partial inspections, for example the formation of the certificate chain and its checking and/or even a checking guideline. The inspection guideline indicates which partial inspections are performed in the certificate. This contains for example the check of the usage options of the key, the root certificates to be used and the like. The first device may, in the request, likewise describe information that it expects as a result. This includes for example the inspection of a revocation status of all of the certificates in a certificate chain or else the inspection of the complete certificate chain as a data element. The first device 11 may likewise indicate whether the response should be transmitted in a protected manner by the first validation apparatus 15. Such cryptographic protection may be implemented for example using a digital signature with a private key of the first validation apparatus. The first device 11 may likewise indicate in the request whether it accepts a result of the validation that is stored in the first validation apparatus and that is referred to below as validation information.

According to embodiments of the invention, the result of the certificate validation, that is to say the validation information, is then provided by a status collection apparatus 30. This validation information provided on the status collection apparatus 30 may be used to reduce the response time between the transmission of the query by the first device 11 until the response and provision of the requested validation information on the first device 11 for the same certificate, since all of the validations no longer have to be performed separately in the first validation apparatus 15. The validation information may be provided in a public directory in a status database 32 that is administrated and controlled by a control apparatus 31. The validation information may however also be stored and provided by a blockchain storage apparatus 33. In the first case, the validation information is stored in the status collection apparatus as an element of the database 32. In the second alternative, the validation information is stored in the form of a block of a blockchain in the blockchain storage apparatus 33, which may also be designed as a distributed storage apparatus.

Figure 2:
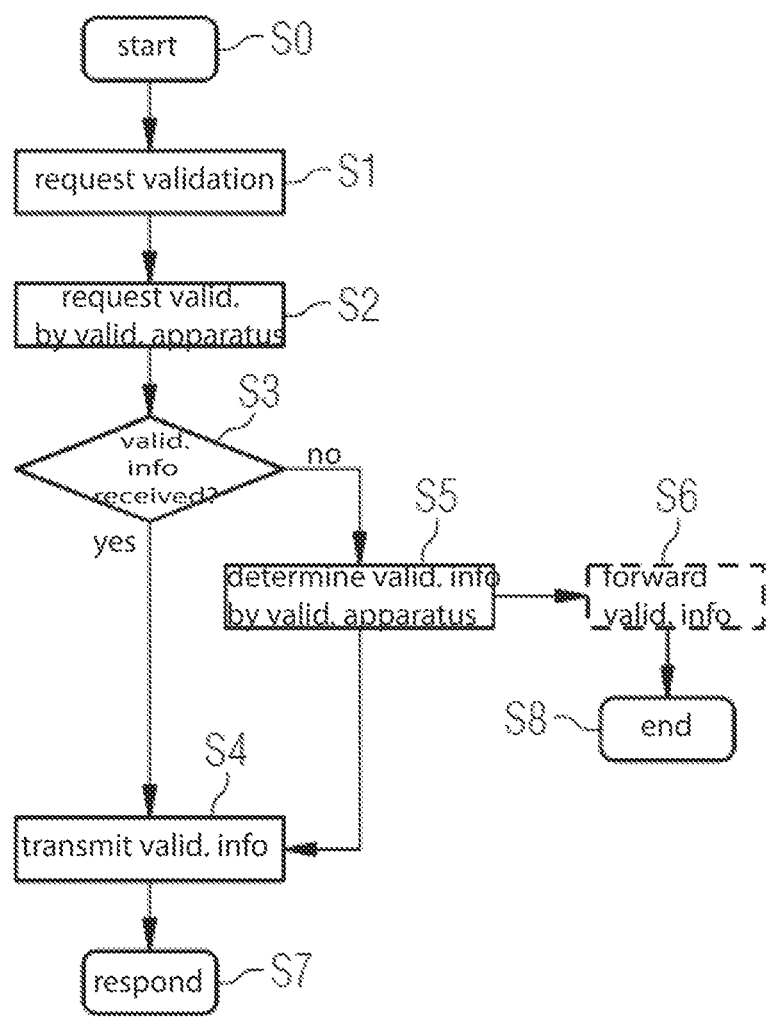
FIG. 2 shows a first exemplary embodiment of the method in the form of a flowchart.

The individual method steps are now described in detail with reference to FIG. 2. In a starting state, see S0, the first device, for example device 11 in FIG. 1, wishes to check a certificate of a communication partner. The communication partner may be any device in the first or second network zone 10, 20, or else an external communication partner 34. In the first method step S1, the first device 11 requests validation of the certificate at a first validation apparatus 15. To this end, the first device 11 transmits for example a request message that contains the certificate to be checked to the first validation apparatus 15. Such a request or request message may also comprise the validation of multiple certificates.

Next, in step S2, the first validation apparatus 15 requests validation information at a status collection apparatus 30. The status collection apparatus 30 uses the information contained in a request message, that is to say a specification of the certificate and optionally further requested partial inspections, to determine validation information. If one or more items of validation information or partial validation information are available in the status collection apparatus 30, the information is transmitted for example to the first validation apparatus 15 in a response message to the query. If it is not possible to determine any validation information in the status collection apparatus 30, then a response message is preferably likewise transmitted to the first validation apparatus 15, but transmitted not contains any validation information.

In method step S3, it is checked in the first validation apparatus 15 whether validation information has been received from the status collection apparatus 30. Next, in method step S4, the validation information is transmitted from the first validation apparatus 15 to the first device, and the request for certificate validation is thus responded to and thus concluded, see S7. If a negative inspection result is determined in the check, see S3, then the validation information of the certificate is determined in the first validation apparatus 15, see S5, and transmitted to the first device, see S4.

It is thus ensured that validation information is provided to the first device 11 in all cases.

If the validation information has been determined in the first validation apparatus 15, see S5, then, in a further method step S6, the validation information is forwarded from the first validation apparatus 15 to the status collection apparatus 30 and the method is ended, see S8.

Figure 3:
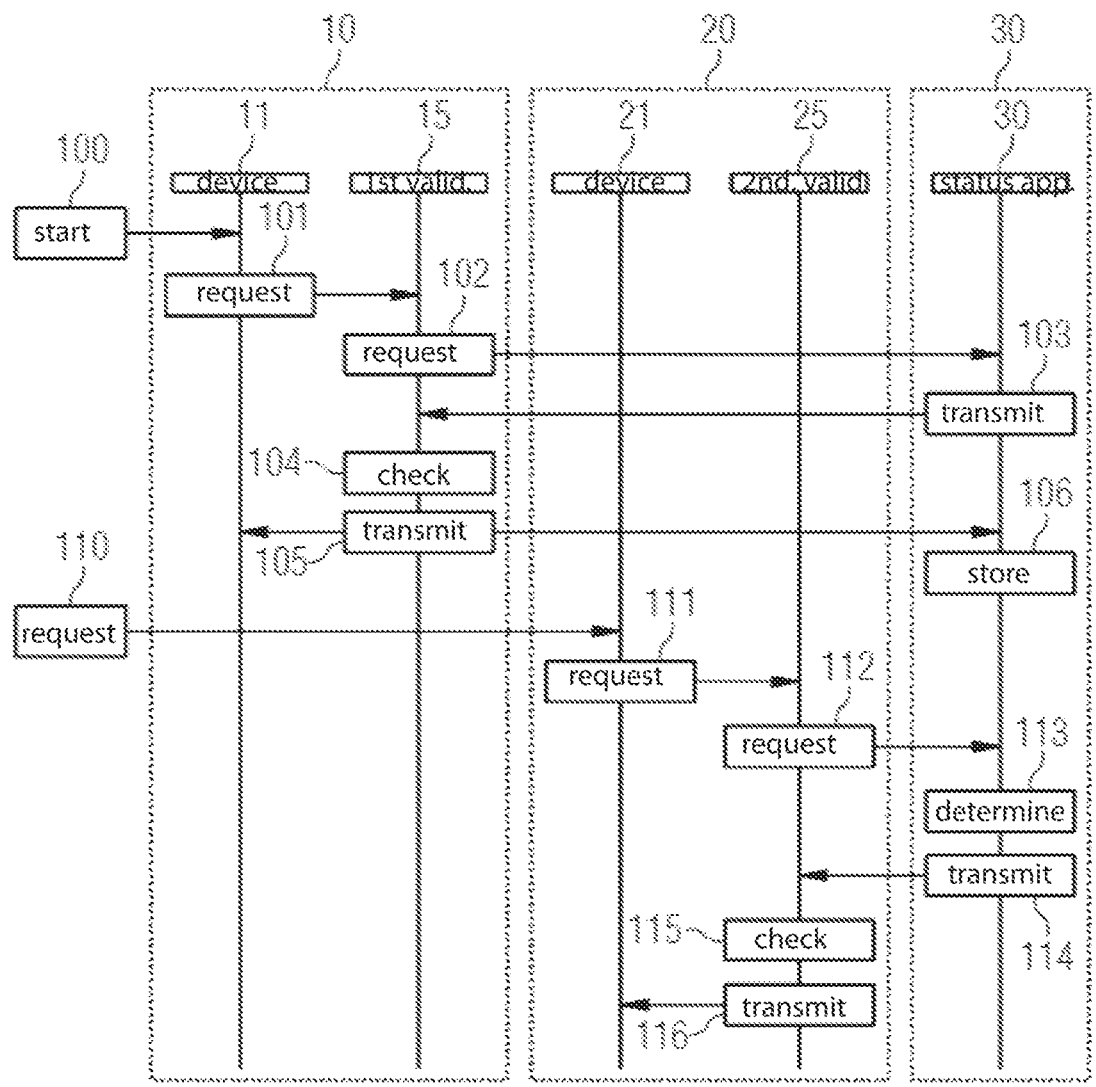
FIG. 3 shows a second exemplary embodiment of the method in the form of a message exchange diagram.

FIG. 3 is the method according to embodiments of the invention with reference to a specific example, in which the first device 11 from the first network zone 10 transmits a certificate request to the first validation apparatus 15, for which there is not yet any validation information in the status collection apparatus 30. Next, a second device 21 that is arranged in the second network zone 20 requests validation of the same certificate at the second validation apparatus 25, which is likewise arranged in the second network zone 20.

As starting point 100, the first device 11 still needs to validate a certificate of a communication partner. To this end, in the first device 11, a request message containing the corresponding certificate of the communication partner and optionally further information about the desired partial inspections is transmitted to the first validation apparatus 15, see 101. The first validation apparatus 15 transmits for example a request message to the status collection apparatus 30 and requests the return of validation information about this certificate, see 102. The status collection apparatus 30 then checks whether such a validation result is present.

In this case, it is not possible to determine a validation result, meaning that the status collection unit 30 transmits a response message to the request without validation information to the first validation apparatus 15, see 103. In the first validation apparatus 15, the received message is then checked for validation information and, since it does not contain any validation information, the certificate is checked locally in the first validation apparatus 15 and the validation information is thus determined, see 104. The first validation apparatus 15 then transmits the validation information to the first device 11 in a non-secure response message and also to the status collection apparatus 30 in a cryptographically protected message, see 105. The validation information is stored in the status storage apparatus, see 106, and may then also be made available to other devices.

The validation information may in this case be cryptographically protected, in particular stored in the status collection apparatus 30 in a manner signed digitally with a private key of the first validation apparatus 15. As an alternative, the cryptographic protection of the validation information by the first validation apparatus 15 is replaced by the status collection apparatus 30 by digital protection by the status collection apparatus 30. By way of example, the digital signature of the validation information by the first validation apparatus 15 may be replaced by a digital signature of the status collection apparatus 30.

Later on, a second device 21 then likewise needs to validate the same certificate, see 110. In accordance with the method already proposed, validation of the certificate is then requested by the second device 21 at the second validation apparatus 25, see 111. The second validation apparatus 25 requests the validation information regarding the certificate at the status collection apparatus 30, see 112. Since the validation information is then present in the status collection apparatus 30, this is determined by the status collection apparatus 30, see 113, and transmitted to the second validation apparatus 25 in a response message, see 114. The cryptographic protection of the validation information is then checked in the second validation apparatus 25, see 115, and the validation information is then transmitted to the second device 21, see 116.

The validation information may be transmitted to the second device 21 either in unprotected form or alternatively with the cryptographic protection of the received validation information or the received message. As an alternative, the second validation apparatus 25 may transmit the validation information itself to the second device 21 with cryptographic protection, for example a signature signed with the private key of the second validation apparatus 25. Accordingly, the respective public key of the component that cryptographically protected the validation information has to be present in the receiving units, for example the status collection apparatus 30 or the second validation apparatus 25 or else the second device 25. Depending on the trustworthiness of the individual components, more or less vulnerable key management is necessary for this purpose.

Figure 4:
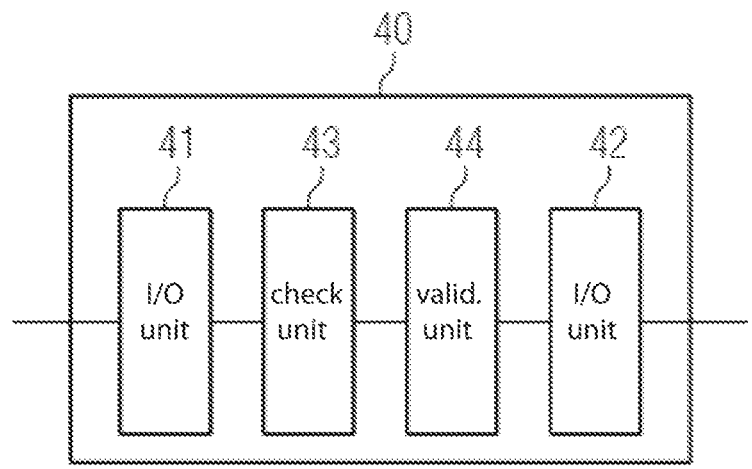
FIG. 4 shows a block diagram of a first exemplary embodiment of a validation apparatus.

FIG. 4 illustrates a validation apparatus 40. It comprises a first input and output unit 41 that is designed to receive a request to validate the certificate of the communication partner from the first device and to transmit the determined validation information to the first device. The validation apparatus 40 furthermore comprises a second input and output unit 42 that is designed to query validation information at a status collection apparatus and to forward validation information determined in the validation apparatus 40 itself to the status collection apparatus. The validation apparatus 40 furthermore comprises a checking unit 43 and a validation unit 44. The checking unit 43 checks the response to the request message from the status collection apparatus for any validation information that it contains. The validation unit 44 validates the certificate itself, that is to say performs a certificate validation itself. The units are in this case executed by one or more processors or electronic circuits.

Figure 5:
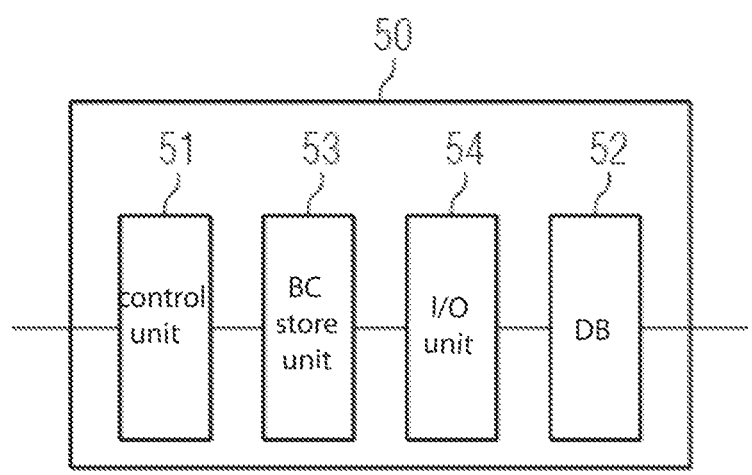
FIG. 5 shows a block diagram of a first exemplary embodiment of a status collection apparatus.

FIG. 5 shows a status collection apparatus 50. It comprises a control unit 51, an input/output unit 54 and a database 52 and, as an alternative or else in addition, a blockchain storage apparatus 53. The input/output unit 54 is designed to receive a request message from a validation apparatus and to transmit a response message thereto back to the validation apparatus. The control unit 51 is designed to query the requested validation information at the database 52 or the blockchain storage apparatus 53 and to incorporate received validation information into the database 52 or the blockchain storage apparatus 53. The control unit 51 is furthermore designed to check the cryptographic protection of the validation information. The control unit 51 may also be designed to cryptographically protect validation information itself, for example to sign it with its own private key.

Using the proposed method for distributing the validation information from the validation apparatus to a central status collection apparatus, it is possible to reduce the response time of the validation apparatus to the requesting device, since this requires less computing time for the validation, in particular of long certificate chains. The faster response time of the validation apparatus to the requesting device thus also reduces the reaction time of the requesting device.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements

The invention claimed is:

1. A method for a validation of a digital certificate of a communication partner on behalf of devices, the method comprising:
   receiving, by a first validation apparatus, a request message containing the digital certificate of the communication partner from a first device, wherein the first device and the first validation apparatus are located on a first network zone;
   transmitting, by the first validation apparatus, a request for validation information of the digital certificate to a status collection apparatus located outside of the first network zone;
   in response to receiving a response message from the status collection apparatus that does not include the validation information, validating, by the first validation apparatus, the digital certificate which includes validating a certificate chain of the digital certificate, wherein the first validation apparatus validates the certificate chain locally in the first network zone on behalf of the first device also located in the first network zone;

transmitting, by the first validation apparatus, the validation information, obtained as a function of the validating, to the first device and also to the storage collection apparatus where the validation information for the digital certificate is stored;

receiving, by a second validation apparatus, a request message containing the digital certificate of the communication partner from a second device, wherein the second device and the second validation apparatus are located on a second network zone that is separate from the first network zone;

transmitting, by the second validation apparatus, a request for validation information of the digital certificate to the status collection apparatus located outside of the second network zone;

in response to receiving the validation information from the storage collection apparatus, which is stored at the status collection apparatus as a function of the first validation apparatus transmitting the validation information to the status collection apparatus in response to the validating the digital certificate on behalf of the first device, transmitting, by the second validation apparatus, the validation information to the second device;

wherein the validation information is stored in the form of a block of a blockchain in a blockchain storage apparatus.

2. The method as claimed in claim 1, wherein the validation information is stored in the status collection apparatus as an element of a database.

3. The method as claimed in claim 1, wherein the validation information is transmitted from the first validation unit to the first device without cryptographic protection.

4. The method as claimed in claim 1, wherein the validation information is cryptographically protected by the first validation apparatus when transmitting the validation information to the status collection apparatus and stored in the status collection apparatus.

5. The method as claimed in claim 4, wherein the validation information cryptographically protected by the first validation apparatus is transmitted from the status collection apparatus to the second validation apparatus only after a successful check of the cryptographic protection in the second validation apparatus.

6. The method as claimed in claim 5, wherein the validation information is transmitted to the second device without cryptographic protection.

7. The method as claimed in claim 5, wherein the validation information is transmitted to the second device with cryptographic protection.

8. The method as claimed in claim 1, wherein the validation information is transmitted from the status collection apparatus to the validation apparatus only when the validation information is stored in the status collection apparatus for less than a predefined period.

9. The method as claimed in claim 1, wherein the method steps are implemented by way of protocol messages in accordance with a standardized certificate validation protocol, in particular a Server-based Certificate Validation Protocol SCVP.

10. A validation apparatus for validating a digital certificate a communication partner on behalf of at least one first device, the validation apparatus comprising:

at least one hardware processor that is configured to:

receive a request message containing the digital certificate of the communication partner from a first device, wherein the first device and the validation apparatus are located on a first network zone;

transmit a request for validation information of the digital certificate to a status collection apparatus located outside of the first network zone;

in response to receiving a response message from the status collection apparatus that does not include the validation information, validate the digital certificate which includes validating a certificate chain of the digital certificate, wherein the validation apparatus validates the certificate chain locally in the first network zone on behalf of the first device also located in the first network zone;

transmit the validation information, obtained as a function of the validating by the validation apparatus, to the first device and also to the storage collection apparatus where the validation information for the digital certificate is stored, wherein the validation information is stored in the form of a block of a blockchain in a blockchain storage apparatus;

wherein a request message containing the digital certificate of the communication partner from a second device is received by a further validation apparatus, wherein the second device and the further validation apparatus are located on a second network zone that is separate from the first network zone;

wherein the further validation apparatus transmits a request for validation information of the digital certificate to the status collection apparatus located outside of the second network zone, and in response to receiving the validation information from the storage collection apparatus, which is stored at the status collection apparatus as a function of the validation apparatus transmitting the validation information to the status collection apparatus in response to the validating the digital certificate on behalf of the first device, the further validation apparatus transmits the validation information to the second device.

11. A status collection apparatus comprising:

at least one hardware processor that is configured to:

receive a query from a first validation apparatus for validation information of a digital certificate of a communication partner, the query being on behalf of a first device located on a first network zone with the first validation apparatus, transmit a response message to the first validation apparatus without the validation information, which triggers the first validation apparatus to validate the digital certificate which includes validating a certificate chain of the digital certificate, wherein the first validation apparatus validates the certificate chain locally in the first network zone on behalf of the first device also located in the first network zone, receive the validation information from the first validation apparatus and store the validation information;

receive a subsequent query from a second validation apparatus for validation information of the digital certificate of the communication partner, the subsequent query being on behalf of a second device located on a second network zone with the second validation apparatus; and transmit the validation information to the second validation apparatus that is stored as a function of the first validation apparatus validating the digital certificate;

wherein the validation information is stored in the form of a block of a blockchain in a blockchain storage apparatus.

12. A computer program product, comprising:

a computer readable non-transitory hardware storage device having computer readable program code stored therein, said program code executable by a processor of a computer system to implement the method as claimed in claim 1.

\* \* \* \* \*